US012658613B2

(12) United States Patent
Sakatani et al.

(10) Patent No.: US 12,658,613 B2
(45) Date of Patent: Jun. 16, 2026

(54) GROUND TERMINAL

(71) Applicant: SUMITOMO WIRING SYSTEMS, LTD., Mie (JP)

(72) Inventors: Atsushi Sakatani, Mie (JP); Yukihiro Fukatsu, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 309 days.

(21) Appl. No.: 18/389,205

(22) Filed: Nov. 13, 2023

(65) Prior Publication Data

US 2024/0178588 A1 May 30, 2024

(30) Foreign Application Priority Data

Nov. 25, 2022 (JP) ................................ 2022-187931

(51) Int. Cl.
*H01R 11/28* (2006.01)

(52) U.S. Cl.
CPC .................................... *H01R 11/28* (2013.01)

(58) Field of Classification Search
CPC .......... H01R 11/28; H01R 11/12; H01R 4/64; H01R 4/185; H01R 13/42; H01R 13/02; H01R 13/648
See application file for complete search history.

(56) References Cited

U.S. PATENT DOCUMENTS

| | | | | |
|---|---|---|---|---|
| 4,175,818 A * | 11/1979 | Kourimsky | H01R 4/5041 439/594 |
| 6,997,746 B2 * | 2/2006 | Taylor | H01R 4/183 439/585 |
| 9,948,014 B2 * | 4/2018 | Yamamoto | H01R 11/28 |
| 2003/0155149 A1 | 8/2003 | Ota et al. | |
| 2015/0079825 A1 * | 3/2015 | Miyamoto | H01R 4/62 439/152 |
| 2016/0329644 A1 * | 11/2016 | Tabata | H01R 4/66 |
| 2017/0310021 A1 * | 10/2017 | Tsuchiya | H01R 33/97 |
| 2017/0310022 A1 * | 10/2017 | Omori | H01R 4/184 |

FOREIGN PATENT DOCUMENTS

| | | |
|---|---|---|
| JP | H09-082384 A | 3/1997 |
| JP | 2015-185487 A | 10/2015 |

* cited by examiner

*Primary Examiner* — Edwin A. Leon
(74) *Attorney, Agent, or Firm* — Venjuris, P.C.

(57) ABSTRACT

A ground terminal 10, 10A is plate-like and provided with a base portion 11 to be fixed to a body 80, a wire connecting portion 12 arranged to be placed on a plate surface of the base portion 11, and a folded portion 13 shaped by being folded in a direction intersecting an extending direction of a wire 90 from the wire connecting portion 12 and connecting the base portion 11 and the wire connecting portion 12. Either one of the base portion 11 and the wire connecting portion 12 includes a protrusion 25, 25A projecting toward the other. The other includes a contact portion 32 facing the protrusion 25, 25A to be able to butt against the protrusion 25, 25A in the extending direction.

10 Claims, 8 Drawing Sheets

GROUND TERMINAL

CROSS-REFERENCE TO RELATED APPLICATIONS

This application is based on and claims priority from Japanese Patent Application No. 2022-187931, filed on Nov. 25, 2022, with the Japan Patent Office, the disclosure of which is incorporated herein in its entirety by reference.

TECHNICAL FIELD

The present disclosure relates to a ground terminal.

BACKGROUND

Japanese Patent Laid-open Publication No. 2003-272731 discloses a ground terminal to be mounted on a body of a vehicle. This ground terminal is plate-like and provided with a fixing portion to be fixed to the body via a bolt, a base plate portion connected to the fixing portion and a separating core wire barrel forming portion projecting from the base plate portion and to be crimped to a core wire of a wire. The separating core wire barrel forming portion is overlaid on a plate surface of the base plate portion by folding an easily breakable portion formed on a base end part by 180°. When the vehicle is disassembled, the wire is pulled upward along a direction intersecting an extending direction of the wire and the easily breakable portion is destroyed, whereby the separating core wire barrel forming portion can be separated together with the wire. Note that a ground terminal formed by coupling separate members is disclosed in Japanese Patent Laid-open Publication Nos. H09-082384 and 2015-185487.

SUMMARY

In the case of Japanese Patent Laid-open Publication No. 2003-272731, the easily breakable portion weak in strength is formed on the base end of the separating core wire barrel forming portion. Thus, if the wire is pulled rearward along the extending direction thereof such as when the ground terminal is mounted on the body, there has been a possibility that the easily breakable portion is unexpectedly deformed and the extending direction of the wire is changed from the original one. In contrast, if the strength of the base end of the separating core wire barrel forming portion is enhanced, there has been a problem that the easily breakable portion is not broken when the vehicle is disassembled and a wire removing operation cannot smoothly proceed.

Accordingly, the present disclosure aims to provide a ground terminal, from which a wire can be easily removed and which can ensure strength against a wire pulling force.

The present disclosure is directed to a ground terminal having a plate-like shape, the ground terminal being provided with a base portion to be fixed to a body, a wire connecting portion arranged to be placed on a plate surface of the base portion, the wire connecting portion being connected to an end part of a wire, and a folded portion shaped by being folded in a direction intersecting an extending direction of the wire from the wire connecting portion, the folded portion connecting the base portion and the wire connecting portion, either one of the base portion and the wire connecting portion including a protrusion projecting toward the other, and the other including a contact portion facing the protrusion to be able to butt against the protrusion in the extending direction.

According to the present disclosure, it is possible to provide a ground terminal, from which a wire can be easily removed and which can ensure strength against a wire pulling force.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
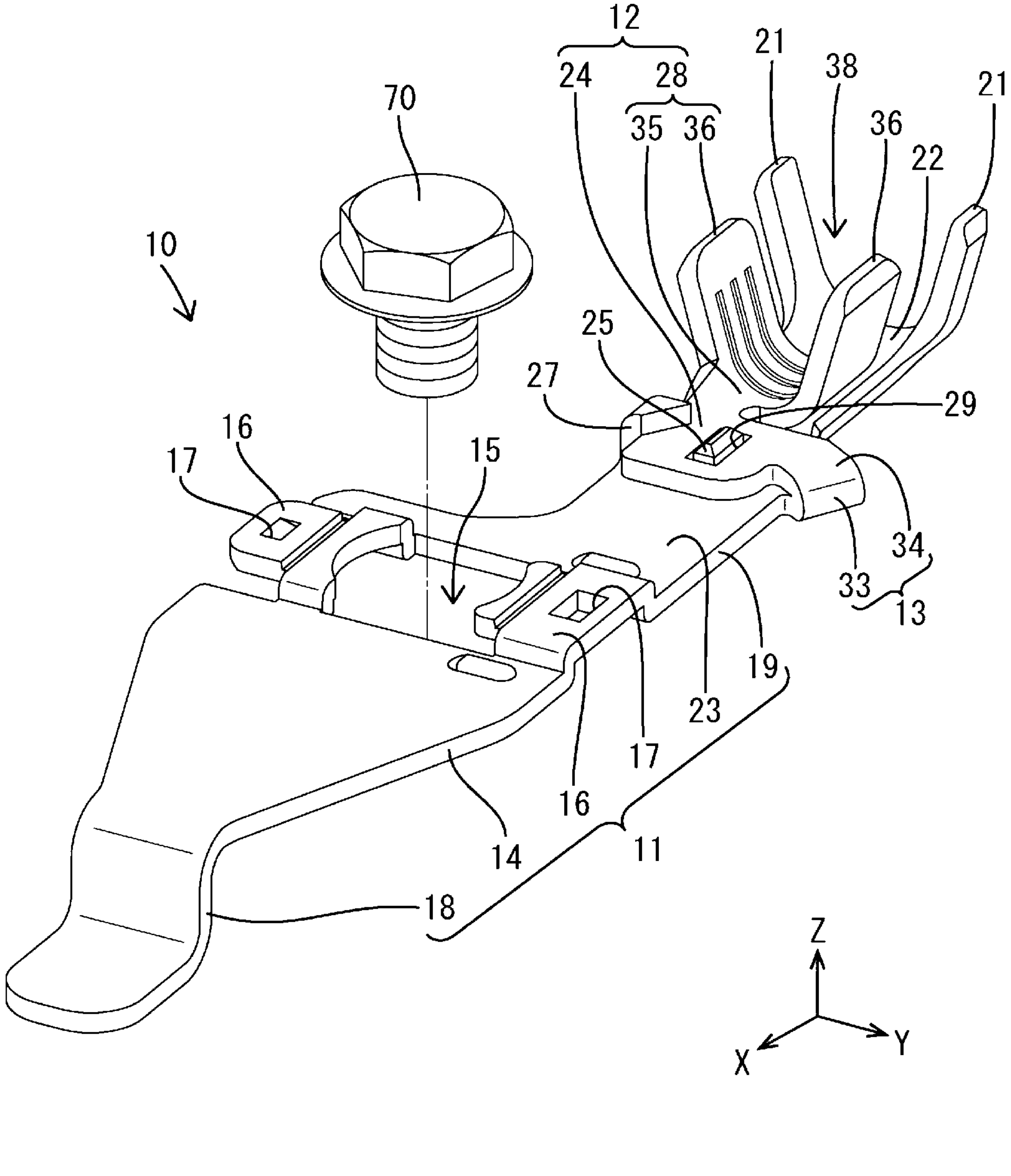
FIG. 1 is a perspective view of a ground terminal of a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The ground terminal of the present disclosure is plate-like and provided with a base portion to be fixed to a body, a wire connecting portion arranged to be placed on a plate surface of the base portion, the wire connecting portion being connected to an end part of a wire, and a folded portion shaped by being folded in a direction intersecting an extending direction of the wire from the wire connecting portion, the folded portion connecting the base portion and the wire connecting portion, either one of the base portion and the wire connecting portion including a protrusion projecting toward the other, and the other including a contact portion facing the protrusion to be able to butt against the protrusion in the extending direction.

In removing the wire from the base portion when a vehicle is disassembled, the folded portion can be broken and the wire connecting portion can be separated from the base portion together with the wire by pulling the wire in the direction intersecting the extending direction of the wire.

Thus, the wire can be removed without unfixing the base portion from the body, and workability can be improved.

On the other hand, even if the wire is pulled in the extending direction, such as when the ground terminal is mounted on the body, the contact portion butts against the protrusion. Thus, the folded portion is not broken and a position shift of the wire connecting portion with respect to the base portion can be restricted. As a result, the extending direction of the wire can be maintained constant.

(2) Preferably, the other includes a hole fittable to the protrusion, and the contact portion is provided on a part facing the protrusion in the extending direction on an inner surface of the hole.

Since a part other than the contact portion on the inner surface of the hole can butt against the protrusion by fitting the protrusion into the hole, the position shift of the wire connecting portion with respect to the base portion can be restricted over the entire periphery of the hole.

(3) The protrusion may be shaped by cutting and raising a part of the one.

Since a position where the contact portion butts against the protrusion can be determined by adjusting a position where the protrusion is cut and raised in the one and a formation position of the hole in the other, a degree of freedom in determining the butting position of the contact portion can be enhanced.

(4) The protrusion may have a long shape in the extending direction in a plan view and have a plate thickness surface facing the contact portion on one end in the extending direction.

There is a concern that the protrusion is deformed when the wire is strongly pulled in the extending direction and the contact portion butts against the protrusion. However, according to the above configuration, since the contact portion can butt against the plate thickness surface of the protrusion long in the extending direction, the protrusion is hardly deformed and the position shift of the wire connecting portion with respect to the base portion can be more reliably restricted.

(5) The plate thickness surface of the protrusion may have a tapered shape gradually inclined toward the contact portion toward a tip of the other.

When the wire is strongly pulled in the extending direction, a displacement of the contact portion butting against the protrusion to be lifted up in a direction intersecting the extending direction can be suppressed by the tapered shape of the protrusion.

(6) The protrusion may include a tip reduced portion for reducing a plate thickness toward the tip of the other.

When the folded portion is folded and the wire connecting portion is placed on the plate surface of the base portion at the time of manufacturing the ground terminal, the protrusion can be guided by the tip reduced portion and avoid interference with the other.

(7) The other may include an expanded portion shaped by being expanded toward the one in an opening part of the hole open in a surface facing the one.

When the folded portion is folded and the wire connecting portion is placed on the plate surface of the base portion at the time of manufacturing the ground terminal, the protrusion can be guided by the expanded portion and smoothly enter the hole.

(8) The one may be the base portion and the other may be the wire connecting portion.

Even if the tip of the protrusion projects from the wire connecting portion, this tip does not interfere with the body. Thus, a sufficient projecting dimension of the protrusion can be ensured.

Details of Embodiments of Present Disclosure

Specific examples of the present disclosure are described below with reference to the drawings. Note that the present invention is not limited to these illustrations, but is represented by claims and intended to include all changes in the scope of claims and in the meaning and scope of equivalents.

First Embodiment

Figure 4:
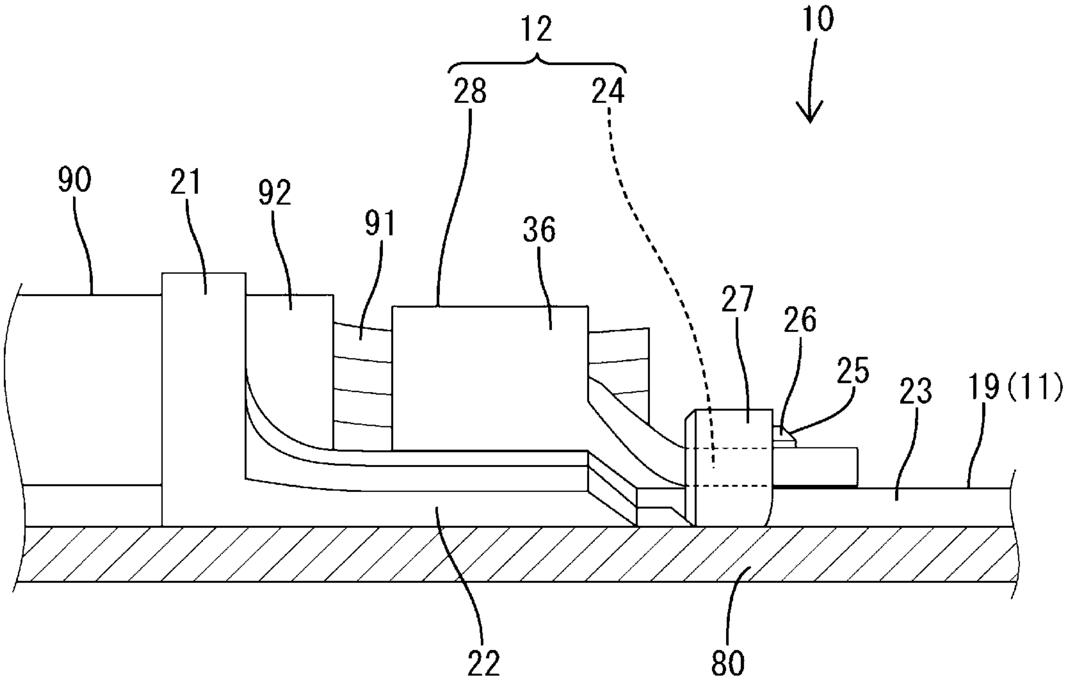
FIG. 4 is a side view showing a state where the rear side of the ground terminal of the first embodiment is connected to an end part of a wire.

A ground terminal 10 of a first embodiment of the present disclosure is formed, such as by stamping one electrically conductive metal plate and, thereafter, bending a stamped metal plate piece, and connected to an end part of a wire 90 as shown in FIG. 4. The ground terminal 10 is mounted on a body 80 of a vehicle. Note that, in the following description, an extending direction of the wire 90 from the ground terminal 10 is referred to as a rearward direction concerning a front-rear direction. A direction opposite to a facing direction of the ground terminal 10 toward the body 80 is referred to as an upward direction concerning a vertical direction. A right side when the ground terminal 10 is viewed from front is referred to as a right side concerning a lateral direction. In FIG. 1, forward, rightward and upward directions are respectively indicated by signs X, Y and Z. Directional references in this specification are expedient and do not necessarily match directions when the ground terminal 10 is mounted on the body 80 of the vehicle.

(Structure of Ground Terminal)

As shown in FIG. 1, the ground terminal 10 is provided with a base portion 11 to be fixed to the body 80, a wire connecting portion 12 to be connected to the wire 90 and a folded portion 13 connecting the base portion 11 and the wire connecting portion 12.

The base portion 11 is arranged with plate surfaces facing in the vertical direction and includes a fixing portion 14 wide in the lateral direction in an intermediate part in the front-rear direction. The fixing portion 14 includes a fixing hole 15 penetrating in a plate thickness direction and locking guide portions 16 arranged on both left and right sides across the fixing hole 15.

The ground terminal 10 is combined with an unillustrated other ground terminal paired with this ground terminal 10, and constitutes a combinational ground terminal. The other ground terminal is assembled with the ground terminal 10 from left while being guided by the locking guide portions 16, and held on the ground terminal 10 by being locked by locking holes 17 of the locking guide portions 16 at an assembled position. The fixing hole 15 of the ground terminal 10 communicates with a fixing hole of the other ground terminal in the vertical direction, and a bolt 70 (see FIG. 1) is inserted into the respective communicating fixing holes from above. The bolt 70 is further inserted into an unillustrated bolt hole of the body 80 and fixed.

The base portion 11 is formed to be gradually narrower in the lateral direction from the fixing portion 14 to a position near a front end. The base portion 11 includes a hooking portion 18 L-shaped in a side view and projecting forward after projecting downward in a part from the position near the front end to the front end. The hooking portion 18 performs a function of positioning with respect to the body 80 by being hooked to the body 80.

Further, the base portion 11 includes an extending portion 19 extending rearward from a right end part of the rear end of the fixing portion 14. The extending portion 19 includes a pair of insulation barrel pieces 21 projecting upward from both left and right end parts of a rear end. The respective insulation barrel pieces 21 are bent by an unillustrated crimping jig and crimped and mechanically connected to a coating 92 of an end part (front end part) of the wire 90. As shown in FIG. 4, the wire 90 is a coated wire and composed of a core wire 91 constituted by a conductor formed by twisting a plurality of strands, and the coating 92 made of insulating resin and surrounding the outer periphery of the core wire 91. The core wire 91 is exposed by removing the coating 92 at the end part of the wire 90.

Figure 2:
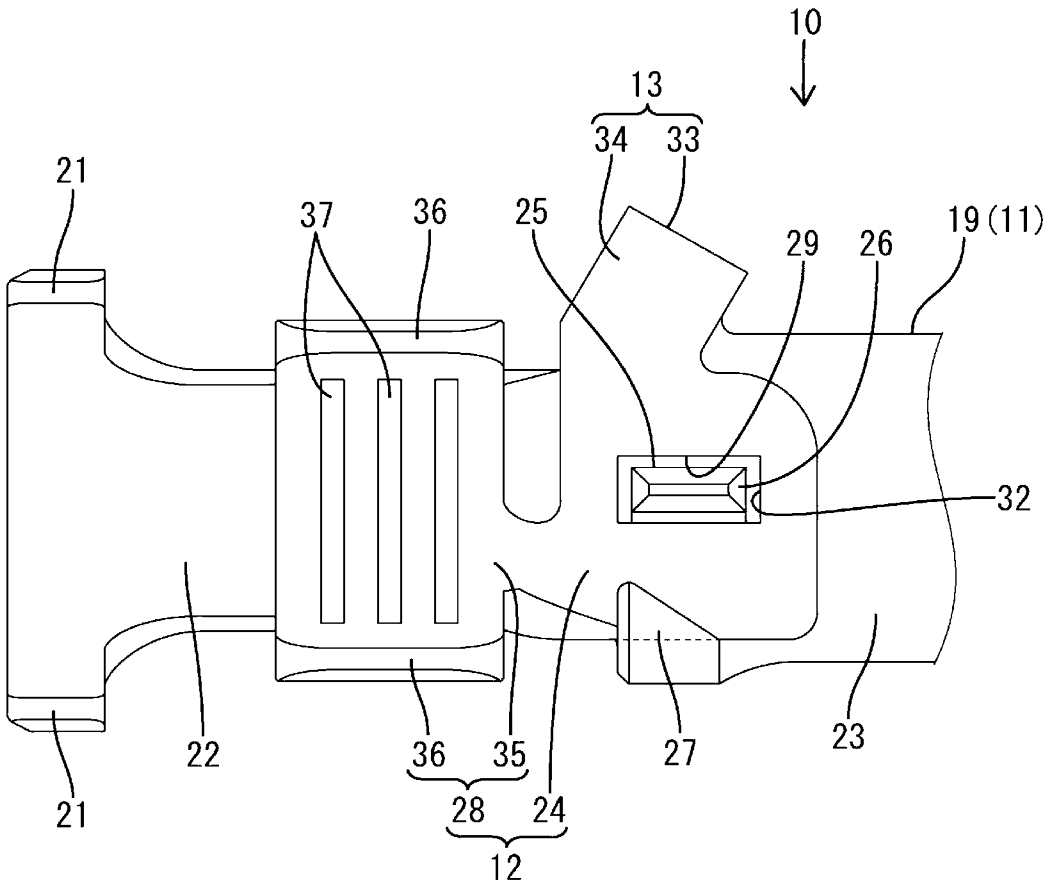
FIG. 2 is a plan view of a rear side of the ground terminal of the first embodiment.

As shown in FIGS. 1 and 2, the extending portion 19 includes a receiving portion 22 having a downwardly curved cross-sectional shape in a part extending forward from between base ends of the respective insulation barrel pieces 21. As shown in FIG. 4, a later-described wire barrel portion 28 of the wire connecting portion 12 is arranged to be placed on the receiving portion 22.

Further, as shown in FIGS. 1 and 2, the extending portion 19 includes a flat plate portion 23 in the form of a flat plate extending in the front-rear direction while having a constant width between the receiving portion 22 and the fixing portion 14. A later-described coupling portion 24 of the wire connecting portion 12 is arranged to be placed on the flat plate portion 23.

Figure 3:
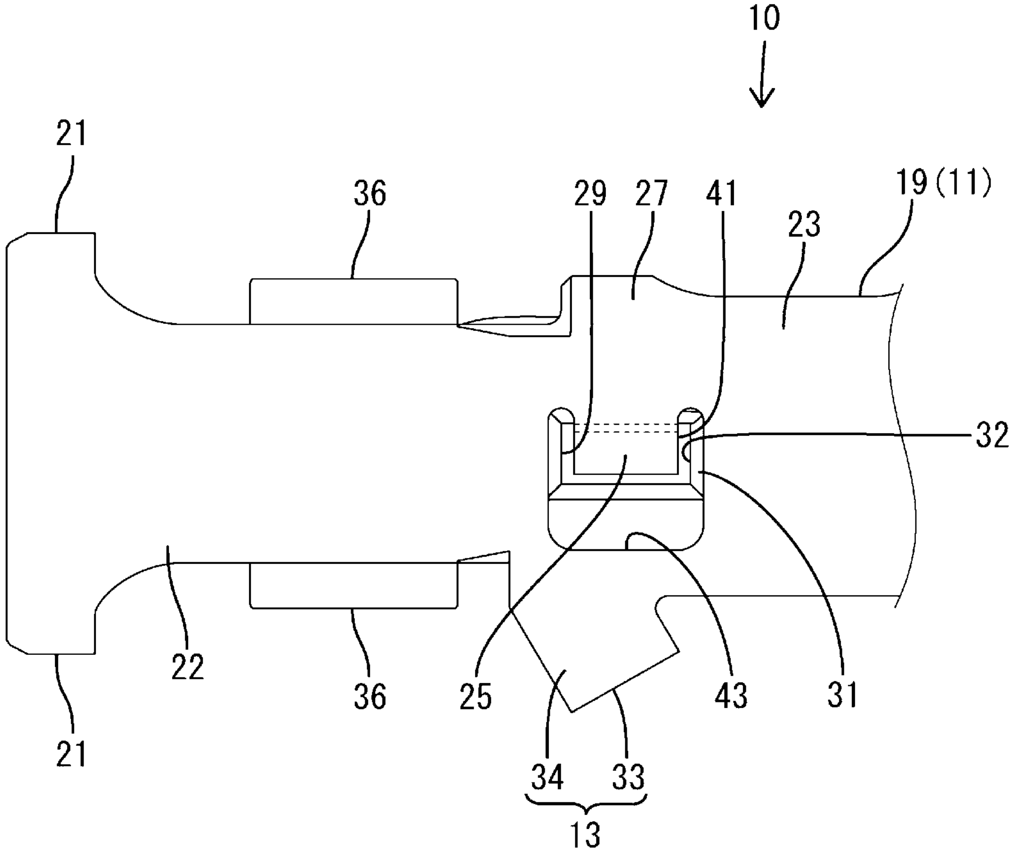
FIG. 3 is a bottom view of the rear side of the ground terminal of the first embodiment.
Figure 5:
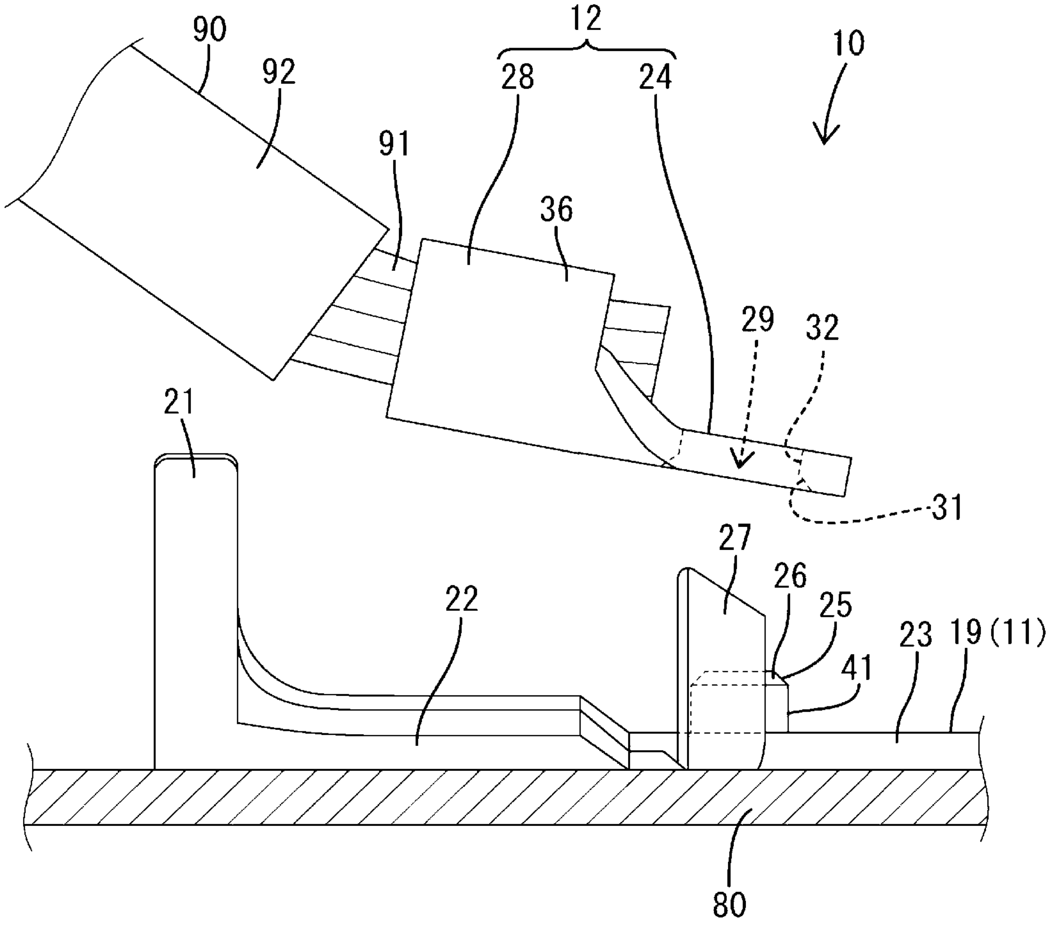
FIG. 5 is a side view showing a state where the wire is removed together with a wire connecting portion from the rear side of the ground terminal of the first embodiment.
Figure 6:
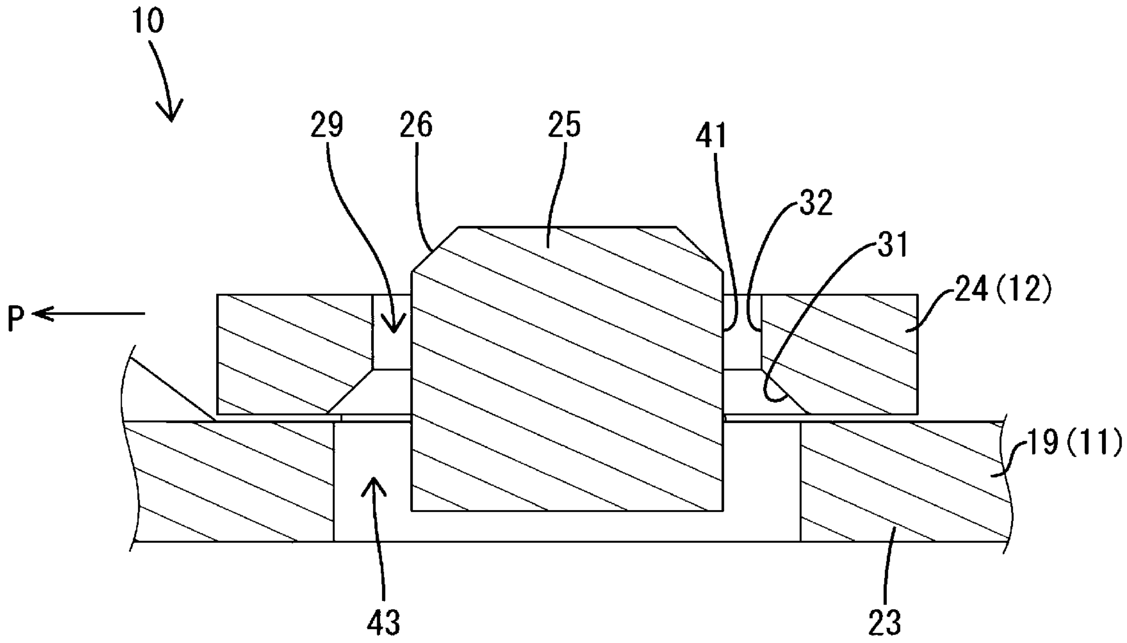
FIG. 6 is a side view in section of a protrusion passed through a hole on the rear side of the ground terminal of the first embodiment.

The flat plate portion 23 includes a protrusion 25 projecting upward at a position near the receiving portion 22. As shown in FIG. 3, the protrusion 25 is formed by bending and raising a tongue piece in a U-shaped cut hole 43 formed in the flat plate portion 23 with the left end of the cut hole 43 as a fulcrum. The protrusion 25 is in the form of a plate long in the front-rear direction in a plan view and rectangular in a side view as shown in FIG. 2, and arranged on the upper surface of the flat plate portion 23 with plate surfaces facing in the lateral direction as shown in FIG. 5. The front end surface of the protrusion 25 is a plate thickness surface 41 and arranged along the vertical direction. As shown in FIGS. 2 and 6, the protrusion 25 includes a tip reduced portion 26 for gradually reducing a plate thickness and a plate width toward a tip (upper end) in an upper end part.

Further, as shown in FIGS. 1 and 2, the base portion 11 includes a pressing portion 27 projecting from a left end part (plate thickness part) of a rear part of the flat plate portion 23. The pressing portion 27 is bent to have a U-shaped cross-section by an unillustrated jig, and a folded part triangular in a plan view is pressed against the upper surface of the coupling portion 24. The coupling portion 24 is sandwiched and held in the vertical direction between the pressing portion 27 and the flat plate portion 23.

Next, the wire connecting portion 12 is described. As shown in FIG. 1, the wire connecting portion 12 is configured by integrally connecting the coupling portion 24 and the wire barrel portion 28 in the front-rear direction.

The coupling portion 24 is flat plate-like and arranged to be placed in close contact with the upper surface of the flat plate portion 23 with plate surfaces facing in the vertical direction. A hole 29 having a rectangular cross-section and long in the front-rear direction is formed in an intermediate part of the coupling portion 24. The hole 29 penetrates through the coupling portion 24 in a plate thickness direction and is open upward.

The protrusion 25 is arranged to pass through the hole 29 of the coupling portion 24. A cross-sectional shape (rectangular cross-section) of the hole 29 is similar to that of the protrusion 25 and one size larger than that of the protrusion 25 (see FIG. 2). As shown in FIG. 6, the hole 29 of the coupling portion 24 includes an expanded portion 31 expanded gradually downward in an opening part open in a lower surface facing toward the flat plate portion 23. As shown in FIG. 3, the expanded portion 31 is formed in each of the front, rear, left and right surfaces of a lower part of the inner surface of the hole 29.

Further, as shown in FIG. 6, the coupling portion 24 includes a contact portion 32 capable of butting against the plate thickness surface 41 of the protrusion 25. The contact portion 32 extends along the vertical direction, and the lower end thereof is connected to the upper end of the expanded portion 31.

As shown in FIG. 1, the folded portion 13 is connected to each of a right end part (plate thickness part) of a rear part of the flat plate portion 23 and a right end part (plate thickness part) of a rear part of the coupling portion 24 and formed to be folded between the respective end parts of the flat plate portion 23 and the coupling portion 24. Specifically, the folded portion 13 includes a folded end part 33 at a position separated rightward from the respective end parts of the flat plate portion 23 and the coupling portion 24. As shown in FIG. 2, the folded end part 33 is arranged along a folding line inclined rightward toward a rear side in a plan view. The folded portion 13 includes an overlapping portion 34 folded about the folded end part 33 by 180° and having plate surfaces held in close contact with each other in the vertical direction. The overlapping portion 34 is strip-like and formed to have the same width as the folded end part 33 from the folded portion 13 to the respective plate thickness parts and extend in a direction orthogonal to an inclination direction of the folded end part 33.

The wire barrel portion 28 is in the form of an open barrel and composed of a bottom portion 35 extending rearward from a left end part (plate thickness part) of the rear part of the coupling portion 24 and a pair of wire barrel pieces 36 projecting upward from both left and right end parts of the bottom portion 35. The bottom portion 35 has a downwardly curved cross-sectional shape like the receiving portion 22 and is arranged to be placed on the upper surface of the receiving portion 22. A width in the front-rear direction of each wire barrel piece 36 is larger than that of each insulation barrel piece 21. As shown in FIG. 4, each wire barrel piece 36 is bent by an unillustrated crimping jig and crimped and electrically and mechanically connected to the core wire 91 exposed at the end part of the wire 90. As shown in FIG. 2, the wire barrel portion 28 includes a plurality of serrations 37 arranged at intervals in the front-rear direction on the mutually facing surfaces of the respective wire barrel pieces 36 and the upper surface of the bottom portion 35, these surfaces serving as the inner surface of the wire barrel portion 28. Each serration 37 has a concave cross-section extending in a circumferential direction on the inner surface of the wire barrel portion 28 and functions to bite into the core wire 91 of the wire 90.

(Functions of Ground Terminal)

In manufacturing the ground terminal 10, the protrusion 25 is formed from a part of the flat plate portion 23 by cutting and raising and, subsequently, the overlapping portion 34 is formed by being folded about the folded end part 33 by 180°. In this way, the wire connecting portion 12 is arranged to be placed on the upper surface of the extending portion 19. Specifically, the coupling portion 24 is placed on the upper surface of the flat plate portion 23 and the wire barrel portion 28 is placed on the upper surface of the receiving portion 22. As the folded portion 13 is folded, the protrusion 25 is fit into the hole 29 of the coupling portion 24 from below. Here, the protrusion 25 is inserted into the hole 29 by being guided by the tip reduced portion 26, and the lower part of the hole 29 is formed with the expanded portion 31 for guiding the protrusion 25. Thus, the protrusion 25 can be smoothly fit into the hole 29 while avoiding interference with the lower surface of the coupling portion 24. As shown in FIG. 6, when the protrusion 25 is inserted into the hole 29, the tip reduced portion 26 is arranged to project upward from the opening end of the hole 29 in the upper surface of the coupling portion 24.

Subsequently, the pressing portion 27 is bent and pressed into contact with the upper surface of the right end part of the coupling portion 24. In this way, the lift of the coupling portion 24 from the flat plate portion 23 is restricted, and a state where the wire connecting portion 12 is placed on the base portion 11 is maintained.

Further, the wire barrel pieces 36 and the insulation barrel pieces 21 are respectively formed to rise from the bottom portion 35 and the receiving portion 22. As shown in FIG. 1, a receiving space 38 coaxially extending in the front-rear direction is formed above the upper surface of the bottom portion 35 between the respective wire barrel pieces 36 and above the upper surface of the receiving portion 22 between the respective insulation barrel pieces 21. The wire 90 is inserted into the receiving space 38 from above and, as shown in FIG. 4, the respective wire barrel pieces 36 are bent and crimped to the core wire 91 of the wire 90 and the respective insulation barrel pieces 21 are bent and crimped to the coating 92 of the wire 90. A crimping force of each insulation barrel piece 21 for the coating 92 is smaller than that of each wire barrel piece 36 for the core wire 91 since the width in the front-rear direction of each insulation barrel piece 21 is smaller than that of each wire barrel piece 36. Thus, each insulation barrel piece 21 is more easily opened than each wire barrel piece 36.

If the wire 90 is pulled rearward (direction of an arrow P in FIG. 6) in fixing the ground terminal 10 to the body 80 or in a fixed state, the contact portion 32 of the hole 29 butts against the plate thickness surface 41 of the protrusion 25 from front to restrict a rearward position shift of the wire connecting portion 12 with respect to the base portion 11. Thus, excessive stress is not applied to the folded portion 13, and the folded portion 13 can be prevented from being deformed or broken. As a result, the extending direction of the wire 90 from the ground terminal 10 can be maintained in the front-rear direction. Further, such as when the wire 90 vibrates in the lateral direction, the protrusion 25 can contact a part other than the contact portion 32 on the inner surface of the hole 29, wherefore a position shift in the lateral direction of the wire connecting portion 12 with respect to the base portion 11 is also restricted.

In removing the wire 90 when the vehicle is disassembled, the wire 90 is pulled upward as shown in FIG. 5. In this way, the pressing portion 27 is opened and the crimped state of the base portion 11 to the wire connecting portion 12 is released. Further, the respective insulation barrel pieces 21 are also opened and the coating 92 at the end part of the wire 90 is separated from the base portion 11. On the other hand, the core wire 91 at the end part of the wire 90 is pulled upward together with the wire connecting portion 12 while being crimped by the respective wire barrel pieces 36. The folded portion 13 receives a pulling force of the wire 90 and is broken. Further, since the opening edge part of the hole 29 in the upper surface of the wire connecting portion 12 is exposed without being blocked by the protrusion 25, the protrusion 25 easily exits from the hole 29 and is separated from the wire connecting portion 12. In this way, the wire 90 can be removed from the body 80 together with the wire connecting portion 12 with the base portion 11 left on the body 80. Here, the folded portion 13 is easily broken due to the folded shape thereof, and is easily broken as the wire 90 is pulled up since the folded end part 33 is inclined with respect to the front-rear direction.

As described above, according to this embodiment, in removing the wire 90 from the base portion 11, the folded portion 13 can be broken and the wire connecting portion 12 can be separated from the base portion 11 together with the wire 90 by pulling the wire 90 upward. Thus, in removing the wire 90, it is not necessary to perform a cumbersome operation of loosening the bolt 70 and removing the base portion 11 from the body 80 and workability can be improved.

On the other hand, if the wire 90 is pulled rearward such as at the time of mounting on the body 80, the contact portion 32 butts against the protrusion 25. Thus, the folded portion 13 is not broken and a position shift of the wire connecting portion 12 with respect to the base portion 11 is restricted. Particularly, since a part other than the contact portion 32 on the inner surface of the hole 29 can also butt against the protrusion 25 by fitting the protrusion 25 into the hole 29, the position shift of the wire connecting portion 12 with respect to the base portion 11 can be restricted over the entire periphery of the hole 29.

Further, since the protrusion 25 is formed by cutting and raising a part of the base portion 11, a position where the contact portion 32 butts against the protrusion 25 can be determined by adjusting a position where the protrusion 25 is cut and raised in the base portion 11 and a formation position of the hole 29 in the wire connecting portion 12. As a result, a degree of freedom in determining the butting position of the contact portion 32 can be enhanced. Since the protrusion 25 is provided on the base portion 11 and the hole 29 is provided in the wire connecting portion 12, even if the protrusion 25 is passed through the hole 29 and projects above the upper surface of the wire connecting portion 12, the protrusion 25 does not interfere with the body 80. As a result, a sufficient projecting dimension of the protrusion 25 can be ensured and, consequently, a sufficient contact area of the protrusion 25 with the contact portion 32 can be ensured.

Further, since the protrusion 25 has a long shape in the front-rear direction in a plan view and the plate thickness surface 41 facing the contact portion 32 is formed on the front end of the protrusion 25, even if the wire 90 is strongly pulled, the shape of the protrusion 25 can be maintained against a butting force of the contact portion 32. As a result, the position shift of the wire connecting portion 12 with respect to the base portion 11 is more reliably restricted.

Further, since the protrusion 25 includes the tip reduced portion 26 and the hole 29 includes the expanded portion 31 expanded toward the base portion 11, the interference of the protrusion 25 with the base portion 11 can be avoided when the wire connecting portion 12 is turned with the folded portion 13 as a fulcrum and placed on the base portion 11.

Second Embodiment

Figure 7:
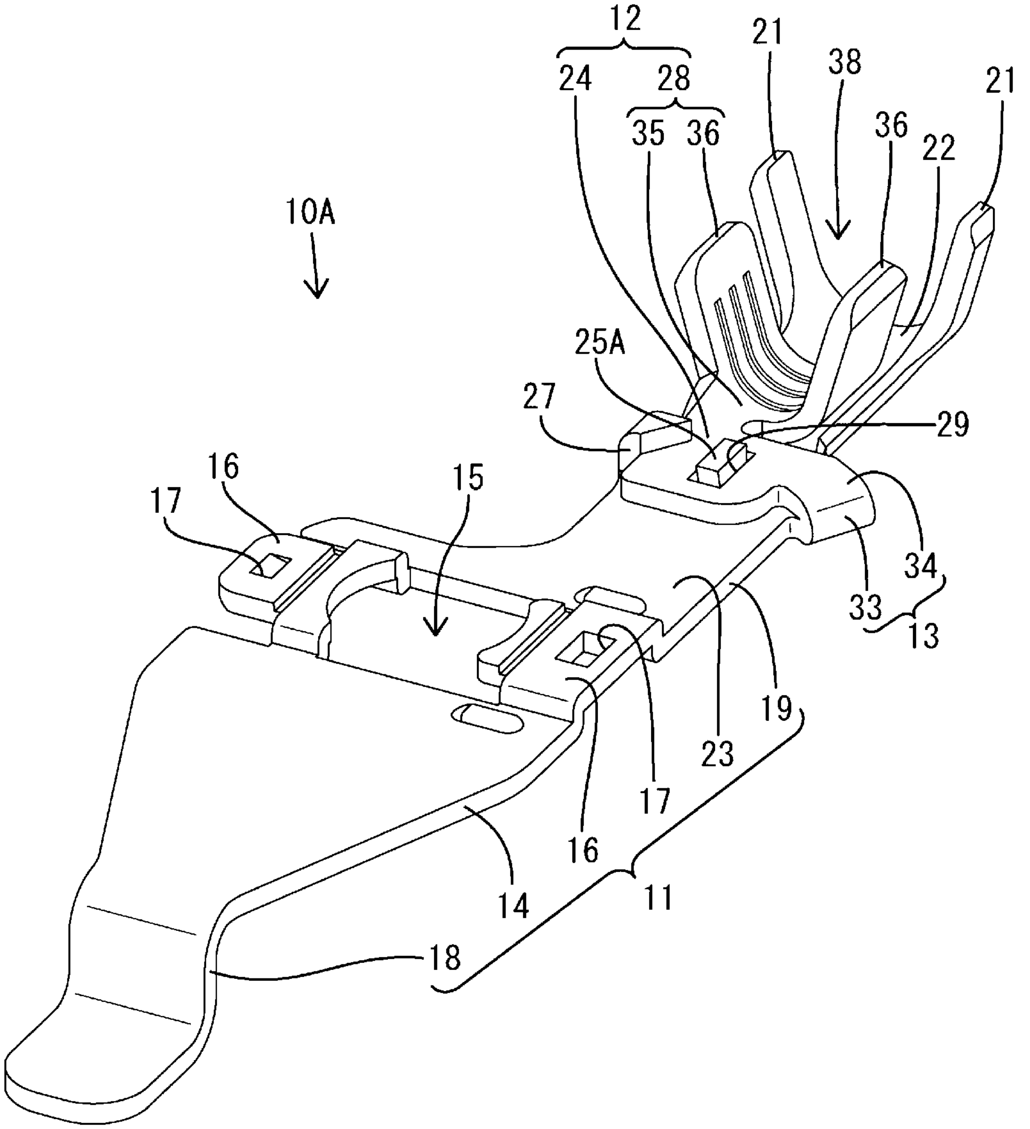
FIG. 7 is a perspective view of a ground terminal of a second embodiment.
Figure 8:
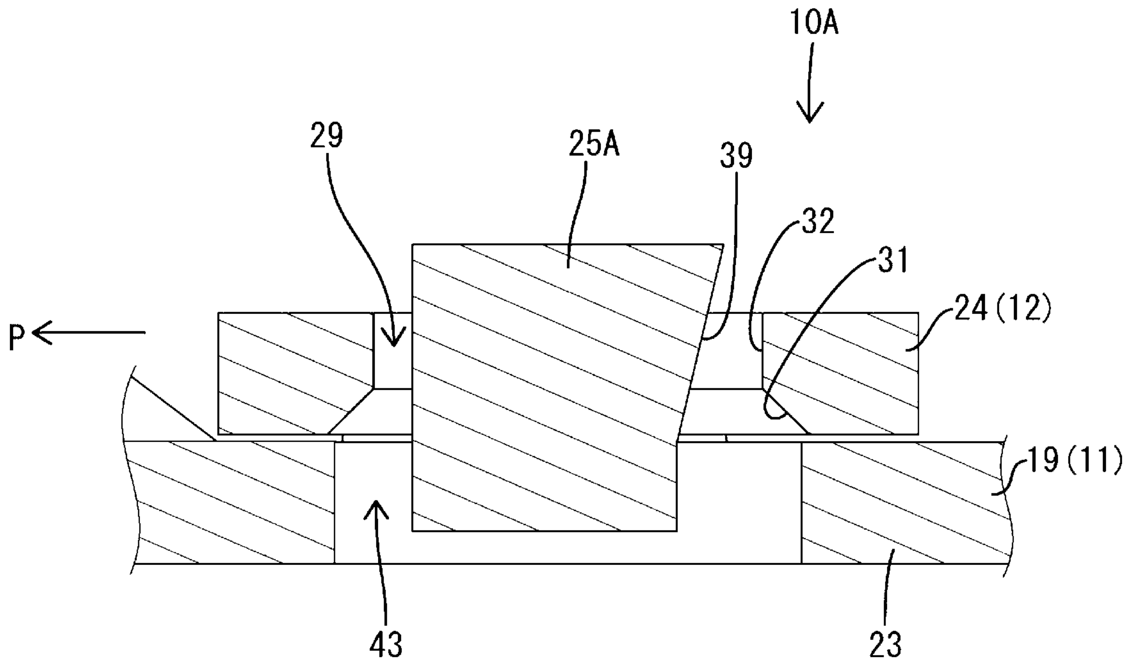
FIG. 8 is a side view in section of a protrusion passed through a hole on a rear side of the ground terminal of the second embodiment.

A ground terminal 10A of a second embodiment differs from the ground terminal 10 of the first embodiment in that a tapered surface 39 is formed on a protrusion 25A as shown in FIG. 8. As shown in FIG. 7, components of the ground terminal 10A other than the protrusion 25A are similar to those in the first embodiment. Note that, in the following description of the second embodiment, the same or similar components as or to those of the first embodiment are denoted by the same reference signs and not repeatedly described.

The protrusion 25A is formed by cutting and raising a part of a base portion 11 and arranged with plate surfaces facing in the lateral direction. As shown in FIG. 8, the protrusion 25A has a trapezoidal shape having an upper side longer than a lower side in a side view of a cut-and-raised part above the upper surface of the base portion 11. Note that the protrusion 25A does not include the tip reduced portion 26. The rear end surface of the protrusion 25A is arranged along vertical direction. The upper end surface of the protrusion 25A is arranged along the front-rear direction.

The front end surface of the protrusion 25A is a plate thickness surface constituting an oblique side of the trapezoidal shape and has a tapered surface 39 inclined forward toward an upper side above the upper surface of the base portion 11. The tapered surface 39 and the upper end surface of the protrusion 25A intersect each other at an acute angle.

With the protrusion 25A inserted in a hole 29, the tapered surface 39 of the protrusion 25A is arranged to face a contact portion 32 of the hole 29. An upper end part of the tapered surface 39 is arranged to be exposed above the upper surface of a coupling portion 24.

If a wire 90 is pulled rearward (direction of an arrow P), the contact portion 32 of the hole 29 butts against the tapered surface 39 from front. Here, since the tapered surface 39 of the protrusion 25A has a tapered shape to restrict an upward displacement of the contact portion 32, a wire connecting portion 12 is firmly locked to the base portion 11. As a result, a rearward position shift of the wire connecting portion 12 with respect to the base portion 11 is more reliably restricted.

OTHER EMBODIMENTS OF PRESENT DISCLOSURE

The above first and second embodiments disclosed this time should be considered illustrative in all aspects, rather than restrictive.

In the case of the first and second embodiments, a plurality of the ground terminals are fixed as one combinational ground terminal to the body. In contrast, according to another embodiment, one ground terminal may be singly fixed to the body. In this case, the locking guide portions can be omitted from the ground terminal.

In the case of the first and second embodiments, the contact portion is formed on the inner surface of the hole of the wire connecting portion. In contrast, according to another embodiment, the contact portion may be formed not on the inner surface of the hole, but on an end part such as the rear end surface of the wire connecting portion.

In the case of the first and second embodiments, the protrusion is formed by cutting and raising a part of the base portion and the base portion is formed with the cut hole due to the cut and raised protrusion. In contrast, according to another embodiment, the protrusion may be formed by bending a projecting piece extending from the base portion without forming the cut hole in the base portion.

In the case of the first and second embodiments, the base portion is provided with the protrusion and the wire connecting portion is provided with the contact portion. In contrast, according to another embodiment, the wire connecting portion may be provided with the protrusion and the base portion may be provided with the contact portion.

In the case of the first and second embodiments, the pair of insulation barrel pieces are provided on the base portion. In contrast, according to another embodiment, the pair of insulation barrel pieces may be provided on the wire connecting portion. In this case, the bottom portion may continuously extend behind the wire barrel portion and the respective insulation barrel pieces may project upward from the both left and right end parts of the bottom portion behind the wire barrel portion.

The protrusion of the second embodiment does not include the tip reduced portion. In contrast, according to another embodiment, the protrusion of the second embodiment may also include the tip reduced portion.

The expanded portion of the first embodiment is formed by reducing the plate thickness and the plate width toward the tip. In contrast, according to another embodiment, the expanded portion may be formed by reducing only the plate thickness toward the tip.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A ground terminal having a plate-like shape, comprising:

a base portion to be fixed to a body;

a wire connecting portion arranged to be placed on a plate surface of the base portion, the wire connecting portion being connected to an end part of a wire; and a folded portion shaped by being folded in a direction intersecting an extending direction of the wire from the wire connecting portion, the folded portion connecting the base portion and the wire connecting portion, either one of the base portion and the wire connecting portion including a protrusion projecting toward the other, and the other including a contact portion facing the protrusion to be able to butt against the protrusion in the extending direction, wherein the base portion, the wire connecting portion, and the folded portion are integrally formed from a single metal plate.

2. The ground terminal of claim 1, wherein:

the other includes a hole fittable to the protrusion, and the contact portion is provided on a part facing the protrusion in the extending direction on an inner surface of the hole.

3. The ground terminal of claim 2, wherein the protrusion is shaped by cutting and raising a part of the one.

4. The ground terminal of claim 1, wherein the protrusion has a long shape in the extending direction in a plan view and has a plate thickness surface facing the contact portion on one end in the extending direction.

5. The ground terminal of claim 4, wherein the plate thickness surface of the protrusion has a tapered shape gradually inclined toward the contact portion toward a tip of the other.

6. The ground terminal of claim 4, wherein the protrusion includes a tip reduced portion for reducing a plate thickness toward a tip of the other.

7. The ground terminal of claim 2, wherein the other includes an expanded portion shaped by being expanded toward the one in an opening part of the hole open in a surface facing the one.

8. The ground terminal of claim 1, wherein the one is the base portion and the other is the wire connecting portion.

9. The ground terminal according to claim 1, wherein the protrusion is formed by cutting a U-shaped notch in the single metal plate at a location corresponding to the base portion and raising a portion defined by the U-shaped notch to project toward the wire connecting portion.

10. The ground terminal according to claim 1, wherein the protrusion has an elongated shape extending in the extending direction of the wire, and the protrusion includes a plate thickness surface as a front end surface thereof, the plate thickness surface being configured to butt against the contact portion when the wire is pulled in the extending direction.

* * * * *